United States Patent
Megat Abdul Aziz et al.

(10) Patent No.: US 9,695,292 B2
(45) Date of Patent: Jul. 4, 2017

(54) EFFERVESCENT TEXTURING

(71) Applicant: Ansell Limited, Richmond, Victoria (AU)

(72) Inventors: Putri Faridatul Akmar Megat Abdul Aziz, Selangor (MY); Mohd Fairuz Mohamad Zawawi, Selangor (MY); Norazilayati Rastam, Selangor (MY); Ahmad Helmi Ujar, Selangor (MY); Hamidon Zain Mohammed, Selangor (MY)

(73) Assignee: Ansell Limited, Victoria (AU)

( * ) Notice: Subject to any disclaimer, the term of this patent is extended or adjusted under 35 U.S.C. 154(b) by 144 days.

(21) Appl. No.: 14/553,032

(22) Filed: Nov. 25, 2014

(65) Prior Publication Data

US 2015/0143611 A1     May 28, 2015

Related U.S. Application Data

(60) Provisional application No. 61/909,107, filed on Nov. 26, 2013.

(51) Int. Cl.
*C08J 9/36* (2006.01)
*C08J 5/02* (2006.01)
(Continued)

(52) U.S. Cl.
CPC .......... *C08J 9/36* (2013.01); *A41D 19/01558* (2013.01); *C08J 5/02* (2013.01); *D06M 15/693* (2013.01); *D06M 23/08* (2013.01); *D06N 3/106* (2013.01); *A41D 19/0065* (2013.01); *C08J 2321/02* (2013.01); *D06M 2200/50* (2013.01);
(Continued)

(58) Field of Classification Search
None
See application file for complete search history.

(56) References Cited

U.S. PATENT DOCUMENTS

| 1,719,633 A | 7/1929 | Teague |
| 1,993,233 A | 3/1935 | Winchester |

(Continued)

FOREIGN PATENT DOCUMENTS

| EP | 0824896 A1 | 2/1998 |
| EP | 2155158 A1 | 2/2010 |

(Continued)

OTHER PUBLICATIONS

Chen et al., www.cosmeticsandtoiletries<http://www.cosmeticsandtoiletries>, 2010.

(Continued)

*Primary Examiner* — Micahel Wieczorek
*Assistant Examiner* — Bradford Gates
(74) *Attorney, Agent, or Firm* — Moser Taboada

(57) ABSTRACT

Provided among other things is method of forming texture on an outer surface of an polymer layer of an article, comprising: applying a latex of polymer particles to (a) a support element of the article or (b) a former, to form an polymer layer; applying to the polymer layer discrete particles of carbonic salt so that they embed into the outer surface and gel elastomer adjacent to the carbonic salt; removing the carbonic salt with an aqueous wash; and curing the polymer layer.

20 Claims, 2 Drawing Sheets

(51) Int. Cl.
  *A41D 19/015* (2006.01)
  *D06M 15/693* (2006.01)
  *D06M 23/08* (2006.01)
  *D06N 3/10* (2006.01)
  *A41D 19/00* (2006.01)

(52) U.S. Cl.
  CPC .... *D06N 2205/10* (2013.01); *D06N 2211/103* (2013.01); *Y10T 428/24355* (2015.01)

(56) References Cited

U.S. PATENT DOCUMENTS

| | | |
|---|---|---|
| 2,293,928 A | 8/1942 | Beal |
| 2,324,735 A | 7/1943 | Spanel |
| 2,353,877 A | 7/1944 | Chollar |
| 2,393,298 A | 1/1946 | De et al. |
| 2,434,035 A | 1/1948 | De Laney et al. |
| 2,503,139 A | 4/1950 | Fabregues-Boixar |
| 2,526,431 A | 10/1950 | Strickhouser |
| 2,642,335 A | 6/1953 | Ewart et al. |
| 2,867,849 A | 1/1959 | Drew et al. |
| 2,873,450 A | 2/1959 | Brodeur |
| 2,997,746 A | 8/1961 | O'Brien et al. |
| 3,869,726 A | 3/1975 | Bell |
| 3,934,062 A | 1/1976 | Tillotson et al. |
| 4,082,862 A | 4/1978 | Esemplare et al. |
| 4,134,109 A | 1/1979 | McCormick et al. |
| 4,218,779 A | 8/1980 | Collyer et al. |
| 4,283,244 A | 8/1981 | Hashmi |
| 4,284,275 A | 8/1981 | Fletcher |
| 4,329,312 A | 5/1982 | Ganz |
| 4,463,156 A | 7/1984 | McGary, Jr. et al. |
| 4,497,072 A | 2/1985 | Watanabe |
| 4,519,098 A | 5/1985 | Dunmire et al. |
| 4,536,890 A | 8/1985 | Barnett et al. |
| 4,555,813 A | 12/1985 | Johnson |
| 4,589,940 A | 5/1986 | Johnson |
| 4,779,290 A | 10/1988 | Welch et al. |
| 5,070,540 A | 12/1991 | Bettcher et al. |
| 5,098,755 A | 3/1992 | Tanquary et al. |
| 5,284,607 A | 2/1994 | Chen |
| 5,304,337 A | 4/1994 | Chen et al. |
| 5,438,709 A | 8/1995 | Green et al. |
| 5,500,469 A | 3/1996 | Johnsen et al. |
| 5,649,326 A | 7/1997 | Richard et al. |
| 5,712,346 A | 1/1998 | Lee |
| 5,822,791 A | 10/1998 | Baris |
| 5,948,707 A | 9/1999 | Crawley et al. |
| 5,977,223 A | 11/1999 | Ryan et al. |
| 5,993,923 A | 11/1999 | Lee |
| 6,019,922 A | 2/2000 | Hassan et al. |
| 6,075,081 A | 6/2000 | Nile et al. |
| 6,081,928 A | 7/2000 | Bourne |
| 6,254,947 B1 | 7/2001 | Schaller |
| 6,306,514 B1 | 10/2001 | Weikel et al. |
| 6,347,409 B1 | 2/2002 | Nile et al. |
| 6,378,137 B1 | 4/2002 | Hassan et al. |
| 6,391,409 B1 | 5/2002 | Yeh et al. |
| 6,440,498 B2 | 8/2002 | Schaller |
| 6,526,593 B2 | 3/2003 | Sajovic |
| 6,527,990 B2 | 3/2003 | Yamashita et al. |
| 6,675,392 B2 | 1/2004 | Albert |
| 6,745,403 B2 | 6/2004 | Sajovic |
| 7,037,579 B2 | 5/2006 | Hassan et al. |
| 7,771,644 B2 | 8/2010 | Flather et al. |
| 7,771,669 B2 | 8/2010 | Chigapov et al. |
| 9,133,047 B2 | 9/2015 | Butters et al. |
| 2001/0011387 A1 | 8/2001 | Yamashita et al. |
| 2001/0053421 A1 | 12/2001 | Schaller |
| 2002/0035744 A1 | 3/2002 | Kolcio et al. |
| 2003/0033660 A1 | 2/2003 | Sajovic |
| 2003/0037364 A1 | 2/2003 | Albert |
| 2003/0102402 A1 | 6/2003 | Williams et al. |
| 2003/0221239 A1 | 12/2003 | Modha et al. |
| 2003/0235545 A1 | 12/2003 | Guenin et al. |
| 2004/0018954 A1 | 1/2004 | Su et al. |
| 2004/0122382 A1 | 6/2004 | Johnson et al. |
| 2005/0015888 A1 | 1/2005 | Altmann et al. |
| 2006/0008631 A1 | 1/2006 | Takeyama et al. |
| 2006/0068140 A1 | 3/2006 | Flather et al. |
| 2006/0143767 A1 | 7/2006 | Yang et al. |
| 2006/0150300 A1* | 7/2006 | Hassan ............... A41D 19/0058 2/161.6 |
| 2006/0159645 A1 | 7/2006 | Miller et al. |
| 2006/0217272 A1 | 9/2006 | Harrison |
| 2006/0269500 A1 | 11/2006 | Riemer et al. |
| 2007/0118967 A1 | 5/2007 | Flather et al. |
| 2007/0192929 A1 | 8/2007 | Flather et al. |
| 2008/0193492 A1 | 8/2008 | Ahmad et al. |
| 2008/0199354 A1 | 8/2008 | Gordon |
| 2008/0253973 A1 | 10/2008 | Tamarkin et al. |
| 2009/0002811 A1 | 1/2009 | Uchiyama et al. |
| 2009/0053312 A1 | 2/2009 | Berndt |
| 2009/0061751 A1 | 3/2009 | Polsky |
| 2009/0071424 A1 | 3/2009 | Takenaka et al. |
| 2009/0077713 A1 | 3/2009 | Saunders et al. |
| 2009/0105424 A1 | 4/2009 | Kodama et al. |
| 2009/0158499 A1 | 6/2009 | Singer |
| 2009/0253810 A1 | 10/2009 | Katz |
| 2009/0255033 A1 | 10/2009 | Chen et al. |
| 2009/0280470 A1 | 11/2009 | Fare et al. |
| 2009/0292081 A1 | 11/2009 | Suddaby |
| 2014/0227342 A1 | 8/2014 | Farber |
| 2014/0326250 A1 | 11/2014 | Arnold et al. |
| 2015/0250704 A1 | 9/2015 | Romanoschi et al. |

FOREIGN PATENT DOCUMENTS

| | | |
|---|---|---|
| FR | 2448307 A1 | 9/1980 |
| GB | 418240 A | 10/1934 |
| JP | S52027899 | 3/1977 |
| JP | S52050902 | 11/1977 |
| JP | S54090362 | 7/1979 |
| JP | S55148919 U | 10/1980 |
| JP | S55163202 A | 12/1980 |
| JP | S58184512 | 12/1983 |
| JP | S62011117 | 1/1987 |
| JP | S63051864 | 10/1988 |
| JP | H01258917 A | 10/1989 |
| JP | H6021364 | 3/1994 |
| JP | H6021365 | 3/1994 |
| JP | H06238683 A | 8/1994 |
| JP | H11192663 A | 7/1999 |
| JP | 2001232653 A | 8/2001 |
| JP | 2001295114 A | 10/2001 |
| JP | 200220913 | 1/2002 |
| JP | 2002249909 A | 9/2002 |
| JP | 2008249909 A | 10/2008 |
| SU | 711051 A1 | 1/1980 |
| WO | WO-0019847 A1 | 4/2000 |
| WO | WO-03102058 A1 | 12/2003 |
| WO | WO-2013029160 A2 | 3/2013 |
| WO | WO-2014055621 A1 | 4/2014 |
| WO | WO-2014152154 A1 | 9/2014 |

OTHER PUBLICATIONS

"Durex Play Lubes, Tingle", <http://www.healthkart.com/sv/durex-play-lubes/SP-11339>.
"Trojan Lubricants", <http://www.trojanlubricants.com/prod_warmth.aspx>.
"Sit Tight™ Saddlebags+", Boots, <http://www.boots.com/en/Soap-Glory%E2%84%A2-Sit-Tight%E2%84%A2-Saddlebags-85ml_1471813/>.
"Encyclopedia Chimica 2", 28th Impression Of Reduced Edition, Mar. 15, 1984, Published by Kyoritsu Publishing co., ltd., pp. 840-841.
Non-Final Office Action U.S. 10/882,016, Nov. 18, 2004, 21 pages.
PCT Written Opinion, PCT/US04/21295, Nov. 24, 2004, 9 pages.
Non-Final Office Action U.S. 10/882,016, Apr. 29, 2005, 24 pages.
Final Office Action U.S Appl. No. 10/882,016, Oct. 19, 2005, 29 pages.

(56) References Cited

OTHER PUBLICATIONS

International Search Report mailed Jan. 17, 2006 for PCT Application No. PCT/US2005/001002.
Non-Final Office Action U.S. Appl. No. 10/882,016, Jul. 5, 2006, 17 pages.
Non-Final Office Action U.S. Appl. No. 10/882,016, Mar. 9, 2007, 23 pages.
Non-Final Office Action U.S. Appl. No. 11/035,366, Jun. 5, 2007, 17 pages.
IPRP and Written Opinion, PCT/US2005/001002, Jul. 17, 2007, 9 pages.
Non-Final Office Action U.S. Appl. No. 10/882,016, Jun. 30, 2008, 9 pages.
Final Office Action U.S. Appl. No. 10/882,016, Dec. 9, 2008, 12 pages.
European Search Report dated Feb. 5, 2009 for No. 04756576.7, 4 pages.
Non-Final Office Action in related U.S. Appl. No. 10/882,016, Aug. 7, 2009, 6 pages.
Non-Final Office Action in U.S. Appl. No. 12/106,711, Oct. 8, 2009, 8 pages.
Non-Final Office Action U.S. Appl. No. 11/639,017, Feb. 2, 2010, 9 pages.
Non-Final Office Action U.S. Appl. No. 11/706,536, Feb. 4, 2010, 9 pages.
Final Office Action, U.S. Appl. No. 11/706,536, Aug. 18, 2010, 10 pages.
European Communication and Search Report dated Jan. 20, 2012 for European Application No. 11176171.4-2037/2404730.

\* cited by examiner

EFFERVESCENT TEXTURING

This application claims the priority of U.S. Ser. No. 61/909,107, filed 26 Nov. 2013, the content of which is incorporated herein in its entirety.

The present application relates generally to methods of providing texture on the surface of an elastomeric layer.

U.S. Pat. No. 7,771,644 describes an efficient method of applying a grip-enhancing texture to elastomeric articles, such as unsupported elastomeric gloves, or supported gloves in which the elastomeric layer is adherent to a support, such as fabric, knit, non-woven fabric, another elastomeric layer, or the like. The textured surface is very effective in enhancing dry grip or oil wet grip. The process applies latex directly to a former, or to a support article so as to leave uncoagulated latex on the outer surface. Discrete particles of salt are then applied to and partially embed into the outer surface, where they coagulate (gel) the latex immediately about the salt, freezing it into a complementary shape. Prior to curing, preferably but not necessarily the salt is washed out of the elastomeric layer formed from the latex.

It has now been discovered that the benefits of discrete salt particle texturing as outlined above can be maintained using carbonate or bicarbonate salts ("carbonic" salts, i.e. mono or di-acid salts of carbonic acid) instead of the standard salts described in U.S. Pat. No. 7,771,644. These salts have proven far less corrosive of the equipment used in dip-forming elastomeric articles. These carbonic salts are typically weaker coagulating agents than more standard salts such as sodium chloride. Thus, both maintaining the grip properties obtained with standard salts and the markedly reduced equipment corrosion obtainable with the revised method are unexpected.

Despite being salt, it has been found that carbonic salts are notably less corrosive than traditional salts such as sodium chloride. Thus, the use of these salts is anticipated to provide a marked cost saving, in reduced down time and capital expense.

SUMMARY

Provided among other things is method of forming texture on an outer surface of an elastomeric layer of an article, comprising: applying a latex of polymer (e.g., elastomeric) particles to (a) a support element of the article or (b) a former, to form a polymer layer; applying to the polymer layer discrete particles of carbonic salt so that they embed into the outer surface and gel elastomer adjacent to the carbonic salt; removing the carbonic salt with an aqueous wash; and curing the polymer layer. By "embed" it is meant that the vast majority of the discrete particles impress into the latex but are not fully engulfed into the latex.

If the support element is polymeric (e.g., elastomeric), it can be formed of one or more "support" layers of polymer. Support layers of polymer will generally include layers that are "continuous" in that they are non-foamed and configured to provide a barrier to water and/or solvent flux (depending on the elastomer) and/or structural support. The applied latex of polymer particles forms "texture" layers. Support elements can be fabric, such as a knitted, woven or non-woven fabric. Support elements can be a combination of fabric and polymer layers. Gloves that lack a fabric support are termed "Non-supported gloves."

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

Figure 1A:
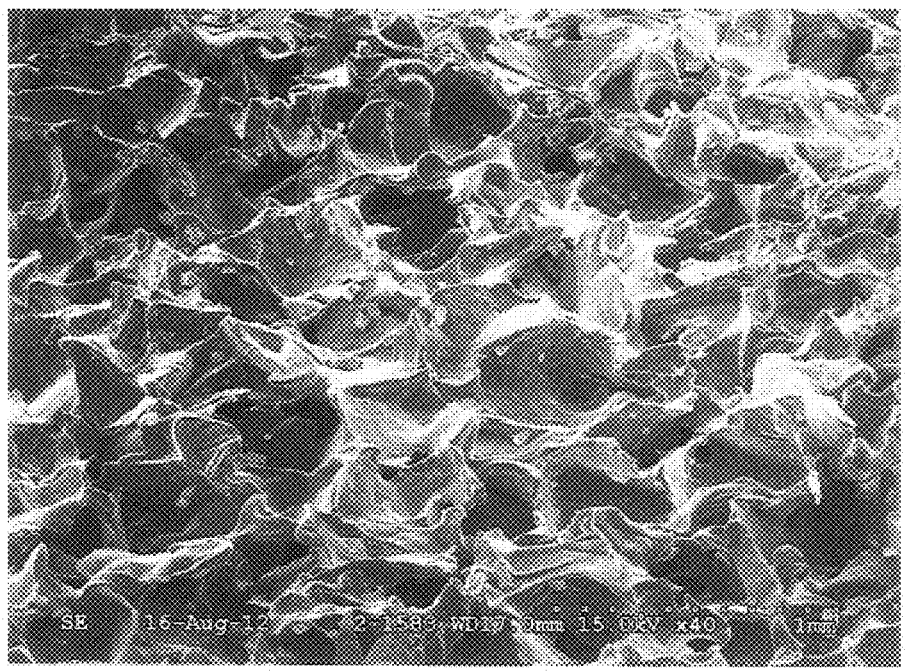
FIG. 1A depicts a scanning electron microscope image of the surface of a glove textured with the discrete salt method.
Figure 1B:
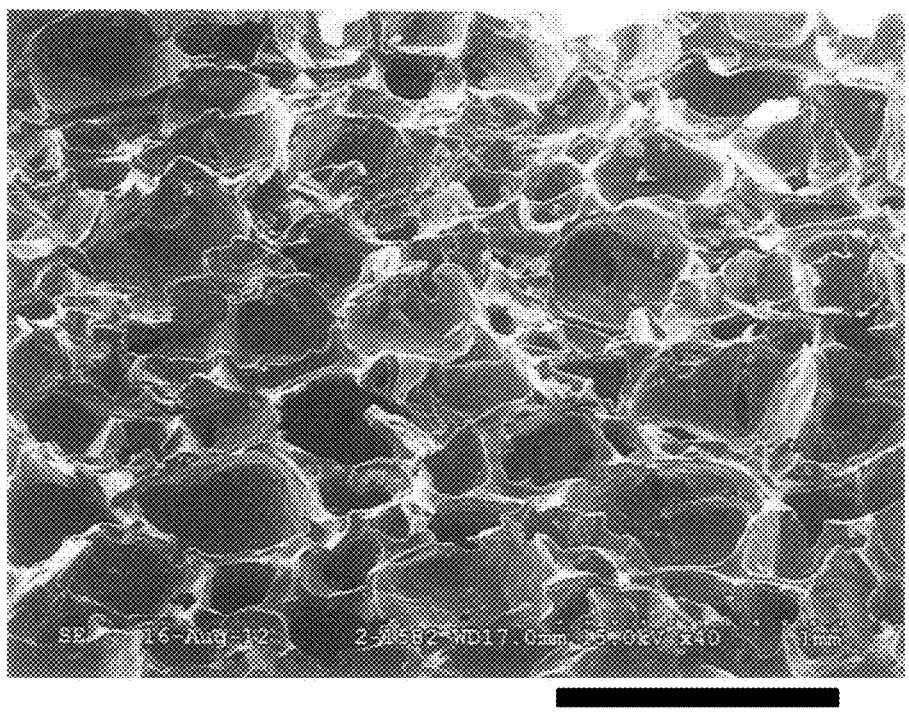
FIG. 1B depicts a scanning electron microscope image of the surface of a glove textured with the discrete carbonic salt method.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

The polymer (e.g. elastomeric) layers (e.g., support or texture layers) may be natural rubber latex (including Guayule latex), synthetic rubber latex, or the like, and combinations thereof. The synthetic rubber latex may be selected, for example, from the group comprised of polychloroprene, acrylonitrile butadiene copolymer (NBR or nitrile) (such as carboxylated acrylonitrile butadiene copolymer), polyisoprene, polyurethane, styrene-butadiene, butyl, and combinations thereof.

In embodiments, the polymer particle compositions may have commonly used stabilizers such as potassium hydroxide, ammonia, sulfonates and the like. In embodiments, the polymer particle compositions may contain other commonly used ingredients such as surfactants, anti-microbial agents, fillers/additives and the like. In embodiments, the polymer particle compositions used to form the polymer layer has a viscosity in the range of for example 1500-5000 centipoises.

Foamed polymer can be used in the texture or support layers. Foam formulations can comprise elastomer, curative agent and foaming agent, and optionally one or more of thickening agent (e.g., MHPC), flow modifier, pigment(s), and the like. Wax or filler additives may be added.

In embodiments, coagulant solution (e.g., 2-10 wt % calcium nitrate solution) is applied to the former or support article and dried prior to application of an elastomeric layer.

When applying a polymer layer, a gellied coagulant can be used to act as an adhesive for the latex to adhere to the former. It can contain for example calcium nitrate, wetting agent (alcohol ethoxylate and/or alkylarylalkoxylate), acids, cellulosic thickener, water-based defoamer and water. The formulation can be designed to have wetting agent(s) in order to have optimum former wetness to minimize potential of major defects such as holes and thin spots. The defoamer(s) function as bubble inhibitors (in the interior portion of layer that remains in embodiments relatively untextured (solid)).

The carbonic salts can be for example sodium carbonate, sodium bicarbonate, potassium carbonate, potassium bicarbonate, ammonium carbonate, ammonium bicarbonate, calcium carbonate, salts with comparable monovalent cations such as lithium, rubidium and cesium, salts with comparable divalent cations such as magnesium, strontium and barium, and the like. In embodiments, the discrete particles have average size from about 0.05 mm to about 2 mm. These sizes will be reflected in the sizes of the texture indentations on the surface of the elastomer layer.

Carbonic salts have the property that a good part of the weight contribution to their density evolves away as $CO_2$ during the process of the invention, and as $H_2O$ if a neutralizing agent is present. Consider the contribution of Na to the density (2.165 g/cc) of NaCl, which is 0.39 parts or 0.84 g/cc. Compare the Na contribution of Na to the density (2.20 g/cc) of $NaHCO_3$, which is 0.26 parts or 0.58 g/cc. Carbonic salts provides numerous stables hydrate salts, such that the Na contribution can be even lower.

Figure 2A:
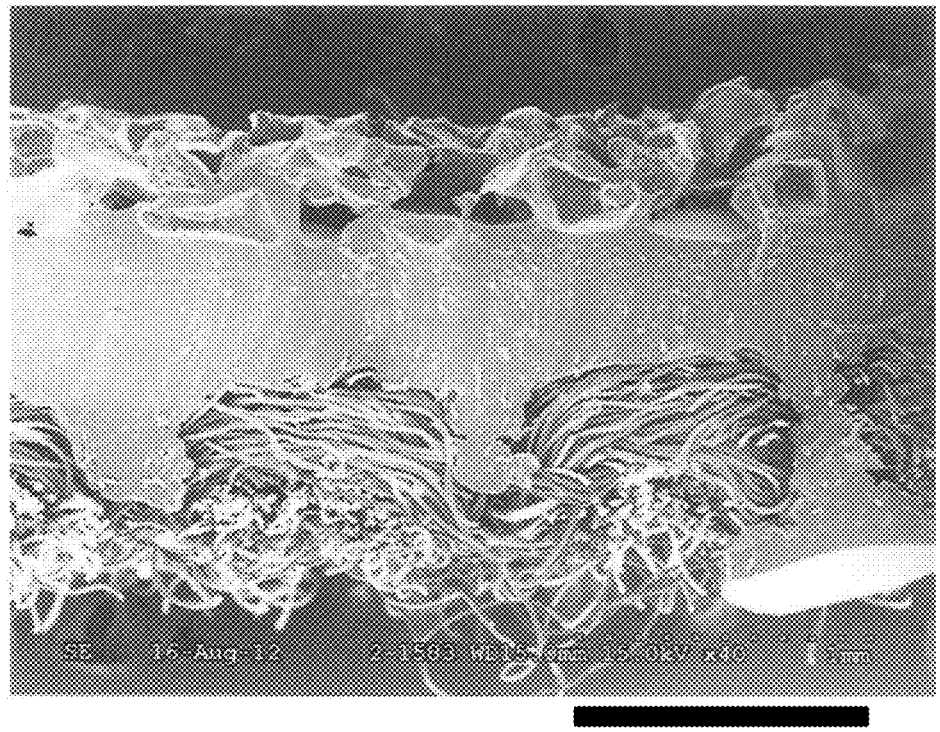
FIG. 2A depicts a scanning electron microscope image of cut-away side view of a glove textured with the discrete salt method.
Figure 2B:
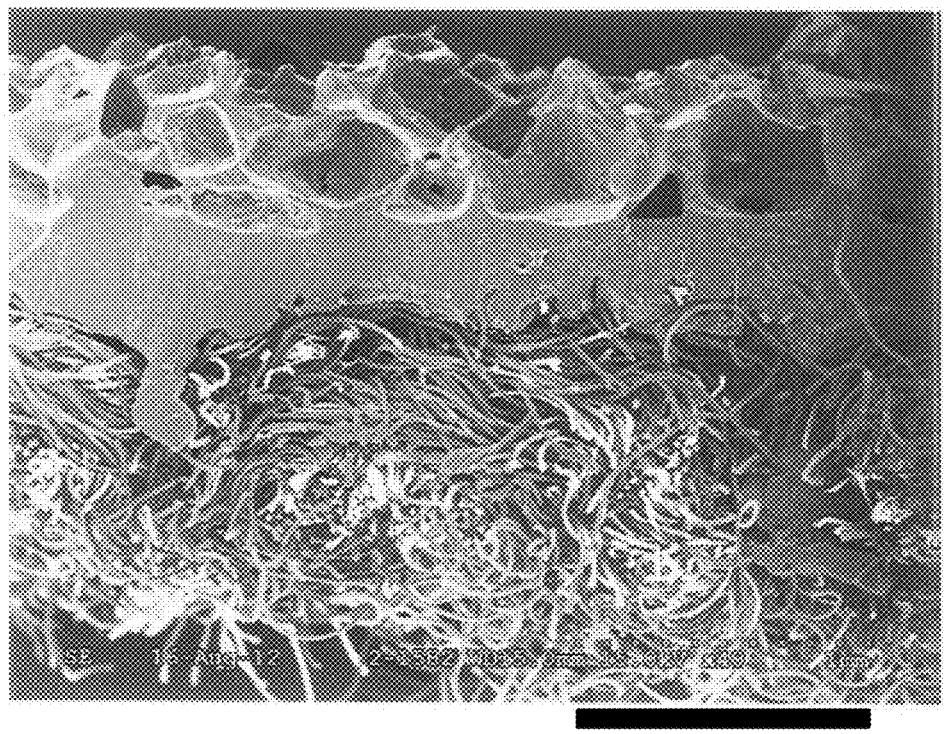
FIG. 2B depicts a scanning electron microscope image of a cut-away side view of a glove textured with the discrete carbonic salt method.

As can be seen in FIG. 2B, an exemplary thickness of the texture layer can be about 36 mil (~0.91 mm). The thickness can be determined ignoring the occasional deep penetrations of the elastomer into support fabric, and using the average upper and lower boundaries. Similarly, exemplary thicknesses of the solid portion of the texture layer can be about 14 mil (~0.36 mm) to about 43 mil (~1.075 mm). In embodiments, the total texture layer is 20 mil to 50 mil in thickness.

The selection of the thickness of any given layer can be influenced by seeking one or more types of finished glove (or other article) performance, such as fit and feel, abrasion resistance, tear resistance, cut resistance, grip, and the like.

Without being limited to theory, it is believed that the fizzing effect of the carbonic salts can create more pores in the texture layer, allowing for liquid or oil to be better dispersed into the texture layer to provide better wet or oil grip. Without being limited to theory, the fizzing effect is believed to create additional fibrous texture, thus providing more surface area for better dry grip.

Without being bound by theory, it is believed that when the latex is coagulated from below with coagulant such that the timing of the process can be such there is no or minimal coagulation at the to-be-textured surface when that surface is contacted with carbonic salt. Without being bound by theory, the carbonic salt coagulates substantially the latex contacted, such that depending on the timing of any wash step, surface latex laterally distant from the carbonic salt is susceptible to wash out, which can provide channels or etched-away texture between indentations formed at the locations contacted with carbonic slat particles. Generally, carbonic salt is a weaker coagulating agent than sodium chloride—such that the delay time after carbonic salt contacting may be about 30-60 s.

Because with many latexes the carbonic salts may be weaker coagulating agents, adjustments in process can be used, such as contacting with carbonic salts at higher temperature, or using longer contact times, or supplementing the carbonic salts with other coagulating agents, such as acids.

Latexes of elastomeric particles are stabilized against coagulation with various compounds, including anionic surfactants. They can thus be tuned for there stability with respect to coagulating salts.

Carbonic salt is removed by washing; upon contact with water the carbonic salt fizzes and releases carbon dioxide and hydroxide ions; with treatment of acid it releases carbon dioxide and water which is not corrosive and has no significant impact to the management of the waste water. Higher temperature (e.g., >40° C.), the presence of acid in the wash, and type of acid and its percentage can accelerate a fizzing affect. However, if fizzing is too aggressive it may cause excess latex to be washed out, resulting in poor texture, thus poor grip. The presence of acid in the wash can enhance latex coagulation (gelling).

In the traditional, e.g., sodium chloride, method, the hydroscopic nature of the material in the presence of water vapor can dissolve the salt into Na+ and Cl– ions, which are electrolytes causing metal to be oxidized, and thereby causing high cost for equipment maintenance. The traditional method also increases by-products ions in the waste water, requiring further treatment to comply with the local waste water regulatory requirements.

In embodiments, the carbonic salt is removed prior to curing. In embodiments, the carbonic salt is removed after curing. In embodiments, carbonic salt is removed by decomposition at elevated temperature, such as >60° C. Higher temperatures can provide faster decomposition.

Articles that can be textured in this way can include for example glove, soles of shoes or socks, grip pads (such as cell phone grip pads or carpet grip pads), the bottom of desk covers (e.g., blotter pads), grips for opening jars, and the like.

Grip force against various test weights is measured for the gloves of the invention and for those textured with sodium chloride, with dry gloves, as follows:

| Dry Challenge Weight | Carbonic Salt Grip Force (kgf) | NaCl Grip Force (kgf) |
| --- | --- | --- |
| 6.5 kg weight | 1.8 | 1.8 |
| 4.5 kg weight | 1.1 | 1.1 |
| 2.5 kg weight | 0.4 | 0.3 |

Grip force against various test weights is measured for the gloves of the invention and for those textured with sodium chloride, with oil-coated gloves, as follows:

| Oil Challenge Weight | Carbonic Salt Grip Force (kgf) | NaCl Grip Force (kgf) |
| --- | --- | --- |
| 6.5 kg weight | 2.9 | 2.8 |
| 4.5 kg weight | 1.9 | 1.9 |
| 2.5 kg weight | 1.3 | 1.2 |

As can be seen, the gloves are identical or virtually identical in grip force. The grip force needed with various challenge weights and conditions can be made to match the traditional sodium chloride force performance by understanding the impact of the fizzing impact and controlling the gelling rate of the elastomeric layer bombarded with the carbonic salts.

In embodiments, the grip force under the various conditions is about 1.7× the value recited above (rounded to the nearest $1/10^{th}$) or less, or about 1.5× or less, or about 1.3× or less, or about 1.1× or less. For example, for a 6.5 kg dry challenge weight, the value is about 1.7× or less, or about 3.06~3.1 kgf or less.

Principle of the Test Method

A test bar with internal sensors that detect grip force (units in kgf) is connected at one end by a cable that passes over and is suspended from an overhead pulley and then connects down to a bucket container on the floor. The bucket is filled with water to provide a certain load of 2.5 kg, 4.5 kg or 6.5 kg. A tester wearing a glove specimen grasps a test bar to provide a minimal force to secure contact and grip so that a certain load (2.5 kg, 4.5 kg & 6.5 kg) can be lifted. The grip force applied on the test bar is then displayed on the digital indicator. The test bar and gloves are covered with water or oil when performing wet and oil grip test, respectively. The wet grip test differs from the oil grip test only in substituting water for the oil. The oil used is Shell Rimula X 15W-40 (Shell Oil Co.), with a dynamic viscosity at −20° C. of 6600 mPa.

| Test Procedure for Oil Grip (Table) |
| --- |
| a) A bucket is placed on a 30 kg balance and filled with tap water to provide a weight of 2.5 kg. |
| b) 5 ml of Shell Rimula X 15W-40 is used to apply on the glove specimen. |
| c) The test bar is then covered with Shell Rimula X 15W-40 by rubbing it with the test glove specimen which has early wetted. |
| d) The tester uses ideally the same hand to grasp the test bar wearing the test glove specimen. |
| e) The gloved hand applies just sufficient grip force to the test bar to provide secure contact and grip so that with a downward movement of the tester's arm the weight could be lifted. |
| f) The grip force (in kgf) applied on the test bar is then displayed on the Digital Indicator in two decimal places. |
| g) The tester shall try several attempts to lift up a certain load and observe any penetration of Shell Rimula X 15W-40 into the tester's hand. |
| h) The bucket is placed on a 30 kg balance and filled with tap water to provide a weight of 4.5 kg. |
| i) Repeat steps 5.7.2 (C) b)-g) for lifting up the load of 4.5 kg. |
| j) The bucket is placed on a 30 kg balance and filled with tap water to provide a weight of 6.5 kg. |
| k) Repeat steps 5.7.2 (C) b)-g) for lifting up the load of 6.5 kg. |

Specific embodiments according to the methods of the present invention will now be described in the following examples. The examples are illustrative only, and are not intended to limit the remainder of the disclosure in any way.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

The invention is further described with respect to the following numbered embodiments:

Embodiment 1

A method of forming texture on an outer surface of an polymer layer of an article, comprising: (1) applying a latex of polymer particles to (a) a support element of the article or (b) a former, to form an polymer layer; (2) applying to the polymer layer discrete particles of carbonic salt so that they embed into the outer surface and gel polymer adjacent to the carbonic salt; (3) removing the carbonic salt with an aqueous wash; and (4) curing the polymer layer.

Embodiment 2

The method of embodiment 1, wherein the time between the applying step and the removing step is limited so that grip-enhancing texture is created between locations where carbonic salt was embedded.

Embodiment 3

The method of one of the foregoing embodiments, wherein the applied latex of polymer particles is foamed.

Embodiment 4

The method of one of the foregoing embodiments, wherein the discrete particles have average size from about 0.05 mm to about 2 mm.

Embodiment 5

The method of one of the foregoing embodiments, wherein the carbonic salt is sodium bicarbonate.

Embodiment 6

The method of one of the foregoing embodiments, wherein the curing is of the carbonic salt-removed polymer layer.

Embodiment 7

The method of embodiment 6, wherein the time between the applying step and the removing step is limited so that grip-enhancing texture is created between locations where carbonic salt was embedded.

Embodiment 11

The method of one of the foregoing embodiments, wherein the carbonic salt is removed after curing.

Embodiment 12

The method of one of the foregoing embodiments, wherein the article is a glove.

Embodiment 13

The method of one of the foregoing embodiments, wherein the article is a fabric supported glove.

Embodiment 14

The method of one of the foregoing embodiments, wherein the article is a non-supported glove.

Embodiment 15

An article an outer layer formed by the method of one of the foregoing embodiments. The method of formation can be determined for example by identifying residual carbonate in conjunction with texture indicative of the application of salt particles. Or, for example, the method of formation can be determined by surface structure indicative of texture modification due to fizzing during the particle washout. Articles of the invention can have texture that, if formed on a glove, would show one or more of the grip forces described above.

Embodiment 16

An article of embodiment 15, that is a glove.

Embodiment 17

The glove of embodiment 16, which is fabric supported.

This invention described herein is of a method for forming texture on an elastomeric article. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A method of forming texture on an outer surface of an polymer layer of an article, comprising:
    applying a latex of polymer particles to (a) a support element of the article or (b) a former, to form an polymer layer with an exterior surface;
    applying to the polymer layer discrete particles of carbonic salt so that they embed into the exterior surface and gel polymer adjacent to the carbonic salt;
    removing the carbonic salt with an aqueous wash; and
    curing the polymer layer.

2. The method of claim 1, wherein the time between the carbonic salt applying step and the removing step is limited so that grip-enhancing texture is created between locations where carbonic salt was embedded.

3. The method of claim 1, wherein the applied latex of polymer particles is foamed.

4. The method of claim 1, wherein the discrete particles have average size from about 0.05 mm to about 2 mm.

5. The method of claim 1, wherein the carbonic salt is sodium bicarbonate.

6. The method of claim 1, wherein the curing is of the carbonic salt-removed polymer layer.

7. The method of claim 6, wherein the time between the carbonic salt applying step and the removing step is limited so that grip-enhancing texture is created between locations where carbonic salt was embedded.

8. The method of claim 6, wherein the applied latex of polymer particles is foamed.

9. The method of claim 6, wherein the discrete particles have average size from about 0.05 mm to about 2 mm.

10. The method of claim 6, wherein carbonic salt is sodium bicarbonate.

11. The method of claim 1, wherein the carbonic salt is removed after curing.

12. The method of claim 1, wherein the article is a glove.

13. The method of claim 1, wherein the article is a fabric supported glove.

14. The method of claim 1, wherein the article is a non-supported glove.

15. An article with an outer layer formed by the method of claim 1.

16. A glove with an outer layer formed by the method of claim 1.

17. The glove of claim 16, which is fabric supported.

18. The glove of claim 16, which is non-supported.

19. A glove with an outer layer formed by the method of claim 2.

20. A glove with an outer layer formed by the method of claim 3.

* * * * *